United States Patent
Shan et al.

(10) Patent No.: US 9,621,845 B2
(45) Date of Patent: Apr. 11, 2017

(54) ARCHITECTURE FOR WEB-BASED REAL-TIME COMMUNICATIONS (WEBRTC) TO ACCESS INTERNET PROTOCOL MULTIMEDIA SUBSYSTEM (IMS)

(71) Applicant: Intel IP Corporation, Santa Clara, CA (US)

(72) Inventors: Chang Hong Shan, Shanghai (CN); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 463 days.

(21) Appl. No.: 14/141,034

(22) Filed: Dec. 26, 2013

(65) Prior Publication Data

US 2014/0325078 A1    Oct. 30, 2014

Related U.S. Application Data

(60) Provisional application No. 61/816,662, filed on Apr. 26, 2013.

(51) Int. Cl.
*G06F 15/16* (2006.01)
*H04N 7/14* (2006.01)
(Continued)

(52) U.S. Cl.
CPC .......... *H04N 7/141* (2013.01); *H04J 11/0023* (2013.01); *H04L 1/1812* (2013.01);
(Continued)

(58) Field of Classification Search
CPC .................................................. H04J 11/0023
(Continued)

(56) References Cited

U.S. PATENT DOCUMENTS 5,331,413 A    7/1994  Diner
5,617,422 A    4/1997  Litzenberger et al.
(Continued)

FOREIGN PATENT DOCUMENTS

CN    105009482 A    10/2015
CN    105052109 A    11/2015
(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Sep. 2013), 182.
(Continued)

*Primary Examiner* — Joseph E Avellino
*Assistant Examiner* — Marshall McLeod
(74) *Attorney, Agent, or Firm* — Schwegman Lundberg & Woessner, P.A.

(57) ABSTRACT

Embodiments for providing an architecture for WebRTC to access Internet Protocol (IP) multimedia subsystem (IMS) are generally described herein. In some embodiments, a non-IMS user equipment (UE) is provided along with an Application Signaling Interworking Function (ASIF) co-located with the non-IMS UE. The non-IMS UE is arranged to send a register message to the ASIF for registering the non-IMS UE with an IMS core. The ASIF is arranged to translate the register message from the non-IMS UE to IMS-based signaling and to register the non-IMS UE with the IMS core using the register message translated to IMS-based signaling.

19 Claims, 9 Drawing Sheets

(51) Int. Cl.

| | | |
|---|---|---|
| *H04W 28/02* | (2009.01) | |
| *H04W 72/04* | (2009.01) | |
| *H04W 52/02* | (2009.01) | |
| *H04W 76/04* | (2009.01) | |
| *H04W 8/00* | (2009.01) | |
| *H04L 5/00* | (2006.01) | |
| *H04W 88/02* | (2009.01) | |
| *H04W 36/00* | (2009.01) | |
| *H04W 60/00* | (2009.01) | |
| *H04L 29/06* | (2006.01) | |
| *H04W 8/22* | (2009.01) | |
| *H04J 11/00* | (2006.01) | |
| *H04W 24/06* | (2009.01) | |
| *H04W 72/12* | (2009.01) | |
| *H04W 48/18* | (2009.01) | |
| *H04L 12/14* | (2006.01) | |
| *H04L 29/08* | (2006.01) | |
| *H04L 1/18* | (2006.01) | |
| *H04W 52/32* | (2009.01) | |
| *H04L 12/801* | (2013.01) | |
| *H04W 76/06* | (2009.01) | |
| *H04W 48/06* | (2009.01) | |
| *H04W 76/02* | (2009.01) | |
| *H04W 88/06* | (2009.01) | |

(52) U.S. Cl.
CPC .......... *H04L 5/0007* (2013.01); *H04L 5/0032* (2013.01); *H04L 12/1407* (2013.01); *H04L 29/06068* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/10* (2013.01); *H04N 7/147* (2013.01); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/32* (2013.01); *H04W 60/00* (2013.01); *H04W 72/0486* (2013.01); *H04W 72/1231* (2013.01); *H04W 72/1278* (2013.01); *H04W 76/023* (2013.01); *H04W 76/046* (2013.01); *H04W 76/048* (2013.01); *H04W 88/02* (2013.01); *H04L 47/10* (2013.01); *H04W 48/06* (2013.01); *H04W 76/027* (2013.01); *H04W 76/068* (2013.01); *H04W 88/06* (2013.01); *Y02B 60/50* (2013.01)

(58) Field of Classification Search
USPC ........................................................ 709/227
See application file for complete search history.

(56) References Cited

U.S. PATENT DOCUMENTS

| | | | |
|---|---|---|---|
| 5,686,957 | A | 11/1997 | Baker |
| 5,963,203 | A | 10/1999 | Goldberg et al. |
| 6,104,721 | A | 8/2000 | Hsu |
| 6,573,907 | B1 | 6/2003 | Madrane et al. |
| 7,724,972 | B2 | 5/2010 | Wang et al. |
| 8,009,735 | B2 | 8/2011 | Le Leannec et al. |
| 8,019,175 | B2 | 9/2011 | Lee et al. |
| 8,331,760 | B2 | 12/2012 | Butcher |
| 8,358,613 | B1 | 1/2013 | Giallorenzi et al. |
| 8,364,698 | B2 | 1/2013 | Delgo et al. |
| 8,452,902 | B2 | 5/2013 | Jang et al. |
| 8,570,359 | B2 | 10/2013 | Ali et al. |
| 8,711,198 | B2 | 4/2014 | Malzbender et al. |
| 8,830,892 | B2 | 9/2014 | Chung et al. |
| 8,842,919 | B2 | 9/2014 | Katz et al. |
| 8,922,718 | B2 | 12/2014 | House et al. |
| 8,970,653 | B2 | 3/2015 | Bowen et al. |
| 8,977,063 | B2 | 3/2015 | Lee et al. |
| 9,031,974 | B2 | 5/2015 | Delgo et al. |
| 9,055,216 | B1 | 6/2015 | Taylor |
| 9,288,434 | B2 | 3/2016 | Bangolae et al. |
| 9,294,714 | B2 | 3/2016 | Gupta et al. |
| 9,307,192 | B2 | 4/2016 | Oyman |
| 9,325,937 | B2 | 4/2016 | Zaus et al. |
| 9,392,539 | B2 | 7/2016 | Yeh et al. |
| 9,414,306 | B2 | 8/2016 | Han et al. |
| 2004/0192211 | A1 | 9/2004 | Gallagher et al. |
| 2005/0143084 | A1 | 6/2005 | Cheng et al. |
| 2005/0202823 | A1 | 9/2005 | Shaheen et al. |
| 2006/0215752 | A1 | 9/2006 | Lee et al. |
| 2006/0238444 | A1 | 10/2006 | Wang et al. |
| 2008/0096566 | A1 | 4/2008 | Brunner et al. |
| 2008/0141239 | A1 | 6/2008 | Larsson et al. |
| 2009/0017826 | A1 | 1/2009 | Shaheen |
| 2009/0040955 | A1 | 2/2009 | Jung et al. |
| 2009/0089435 | A1* | 4/2009 | Terrill ................. H04L 65/1069 709/227 |
| 2009/0111478 | A1 | 4/2009 | Jallon |
| 2009/0129388 | A1* | 5/2009 | Akhtar .................... H03M 7/30 370/392 |
| 2009/0147685 | A1 | 6/2009 | Malhotra et al. |
| 2009/0210766 | A1 | 8/2009 | Katayama et al. |
| 2009/0280802 | A1 | 11/2009 | Chin et al. |
| 2009/0323613 | A1 | 12/2009 | Frederiksen et al. |
| 2010/0026781 | A1 | 2/2010 | Ali et al. |
| 2010/0045773 | A1 | 2/2010 | Ritchey |
| 2010/0067433 | A1 | 3/2010 | Cheng et al. |
| 2010/0074182 | A1 | 3/2010 | Shao |
| 2010/0081391 | A1 | 4/2010 | Suzuki et al. |
| 2010/0118111 | A1 | 5/2010 | Bouazizi |
| 2010/0130237 | A1 | 5/2010 | Kitazoe et al. |
| 2010/0202476 | A1 | 8/2010 | Chun et al. |
| 2010/0202561 | A1 | 8/2010 | Gorokhov et al. |
| 2010/0208607 | A1 | 8/2010 | Chin et al. |
| 2010/0220652 | A1 | 9/2010 | Ishii et al. |
| 2010/0238805 | A1 | 9/2010 | Ludwig et al. |
| 2010/0317394 | A1 | 12/2010 | Harris et al. |
| 2011/0019633 | A1 | 1/2011 | Tajima et al. |
| 2011/0109716 | A1 | 5/2011 | Choi |
| 2011/0161441 | A1 | 6/2011 | Haruna et al. |
| 2011/0195710 | A1 | 8/2011 | Nas et al. |
| 2011/0217980 | A1 | 9/2011 | Faurie et al. |
| 2011/0217985 | A1 | 9/2011 | Gorokhov |
| 2011/0235706 | A1 | 9/2011 | Demircin et al. |
| 2011/0242975 | A1 | 10/2011 | Zhao et al. |
| 2011/0250888 | A1 | 10/2011 | Ryu et al. |
| 2011/0258313 | A1 | 10/2011 | Mallik et al. |
| 2011/0263255 | A1 | 10/2011 | Alonso-Rubio et al. |
| 2011/0268084 | A1 | 11/2011 | Tanabe et al. |
| 2012/0008574 | A1 | 1/2012 | Xiao et al. |
| 2012/0087396 | A1 | 4/2012 | Nimbalker et al. |
| 2012/0122440 | A1 | 5/2012 | Krishnamurthy et al. |
| 2012/0151009 | A1 | 6/2012 | Bouazizi et al. |
| 2012/0176884 | A1 | 7/2012 | Zhang et al. |
| 2012/0281621 | A1 | 11/2012 | Lotfallah et al. |
| 2012/0287881 | A1 | 11/2012 | Arnott et al. |
| 2012/0307794 | A1 | 12/2012 | Shaheen et al. |
| 2012/0320141 | A1 | 12/2012 | Bowen et al. |
| 2013/0039180 | A1 | 2/2013 | Hong et al. |
| 2013/0039339 | A1 | 2/2013 | Rayavarapu et al. |
| 2013/0040671 | A1 | 2/2013 | Zawaideh et al. |
| 2013/0044697 | A1 | 2/2013 | Yoo et al. |
| 2013/0045707 | A1 | 2/2013 | Lee et al. |
| 2013/0051277 | A1 | 2/2013 | Hakola et al. |
| 2013/0101036 | A1 | 4/2013 | Zhou |
| 2013/0170415 | A1 | 7/2013 | Fukuta et al. |
| 2013/0170479 | A1 | 7/2013 | Fong et al. |
| 2013/0195074 | A1 | 8/2013 | Keller et al. |
| 2013/0201824 | A1 | 8/2013 | Venkatachalam et al. |
| 2013/0258919 | A1 | 10/2013 | Damnjanovic |

(56) References Cited

U.S. PATENT DOCUMENTS

| | | | |
|---|---|---|---|
| 2013/0266004 A1* | 10/2013 | Nunez Sanz | H04L 29/06068 370/354 |
| 2013/0301501 A1 | 11/2013 | Olvera-Hernandez et al. | |
| 2014/0176663 A1 | 6/2014 | Cutler et al. | |
| 2014/0219088 A1 | 8/2014 | Oyman et al. | |
| 2014/0225918 A1 | 8/2014 | Mittal et al. | |
| 2014/0259127 A1* | 9/2014 | Shaw | H04L 63/0884 726/5 |
| 2014/0286215 A1 | 9/2014 | Koc et al. | |
| 2014/0295864 A1 | 10/2014 | Gunnarsson et al. | |
| 2014/0320587 A1 | 10/2014 | Oyman | |
| 2014/0321272 A1 | 10/2014 | Bangolae et al. | |
| 2014/0321343 A1 | 10/2014 | Gupta et al. | |
| 2014/0321360 A1 | 10/2014 | Han et al. | |
| 2014/0321369 A1 | 10/2014 | Davydov et al. | |
| 2014/0323128 A1 | 10/2014 | Zaus et al. | |
| 2014/0323133 A1 | 10/2014 | Yeh et al. | |
| 2015/0195490 A1 | 7/2015 | Oyman et al. | |
| 2016/0227166 A1 | 8/2016 | Oyman | |

FOREIGN PATENT DOCUMENTS

| | | |
|---|---|---|
| CN | 105052202 A | 11/2015 |
| CN | 1051103622 A | 11/2015 |
| CN | 105324952 A | 2/2016 |
| CN | 105340327 A | 2/2016 |
| EP | 2849494 A1 | 3/2015 |
| EP | 2979373 A | 2/2016 |
| EP | 2989734 | 3/2016 |
| EP | 2989790 | 3/2016 |
| EP | 2989827 | 3/2016 |
| EP | 2989830 | 3/2016 |
| EP | 2989842 | 3/2016 |
| JP | 2008518536 A | 5/2008 |
| JP | 2009520390 A | 5/2009 |
| JP | 2012527796 A | 11/2012 |
| JP | 2016517234 A | 6/2016 |
| KR | 20080067273 A | 7/2008 |
| KR | 1020090006281 A | 1/2009 |
| KR | 20100054015 A | 5/2010 |
| KR | 1020110051787 A | 5/2011 |
| KR | 1020110102935 A | 9/2011 |
| KR | 1020120099805 A | 9/2012 |
| TW | 201246954 A | 11/2012 |
| TW | 201301920 A | 1/2013 |
| TW | 201446026 A | 12/2014 |
| TW | 201501498 A | 1/2015 |
| TW | 201507374 A | 2/2015 |
| WO | WO-2007053851 A2 | 5/2007 |
| WO | WO-2009025535 | 2/2009 |
| WO | WO-2012065658 A1 | 5/2012 |
| WO | WO-2013025040 A2 | 2/2013 |
| WO | WO-2013052440 A1 | 4/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

"U.S. Appl. No. 14/107,400, Non Final Office Action mailed May 27, 2015", 21 pgs.
"U.S. Appl. No. 14/109,121, Non Final Office Action mailed Apr. 29, 2015", 6 pgs.
"U.S. Appl. No. 14/109,121, Non Final Office Action mailed Aug. 14, 2015", 8 pgs.
"U.S. Appl. No. 14/109,121, Response filed Jul. 28, 2015 to Non Final Office Action mailed Apr. 29, 2015", 10 pgs.
"U.S. Appl. No. 14/132,525, Examiner Interview Summary mailed May 28, 2015", 3 pgs.
"U.S. Appl. No. 14/132,525, Non Final Office Action mailed May 7, 2015", 15 pgs.
"U.S. Appl. No. 14/132,525, Response filed Aug. 7, 2015 to Non Final Office Action mailed May 7, 2015", 14 pgs.
"U.S. Appl. No. 14/132,974, Non Final Office Action mailed Jul. 10, 2015", 8 pgs.
"U.S. Appl. No. 14/135,265, Non Final Office Action mailed Jul. 29, 2015", 11 pgs.
"U.S. Appl. No. 14/140,823, Non Final Office Action mailed Aug. 5, 2015", 6 pgs.
"U.S. Appl. No. 14/140,823, Preliminary Amendment filed Mar. 26, 2014", 3 pgs.
"U.S. Appl. No. 14/141,985, Non Final Office Action mailed Jul. 8, 2015", 20 pgs.
"Control Signaling to Support for Enhanced DL MIMO", R1-104021, 3GPP TSG RAN WG1 Meeting #61bis, (2010), 6 pgs.
"Discussion on scenarios for evaluation of interference cancellation and suppression schemes", R1-130927, 3GPP TSG-RAN WG1 #72bis, (2013), 3 pgs.
"International Application Serial No. PCT/US2014/031845, International Search Report mailed Aug. 26, 2014", 3 pgs.
"International Application Serial No. PCT/US2014/031845, Written Opinion mailed Aug. 26, 2014", 4 pgs.
"International Application Serial No. PCT/US2014/033965, International Search Report mailed Aug. 7, 2014", 3 pgs.
"International Application Serial No. PCT/US2014/033965, Written Opinion mailed Aug. 7, 2014", 5 pgs.
"International Application Serial No. PCT/US2014/034307, International Search Report mailed Aug. 11, 2014", 3 pgs.
"International Application Serial No. PCT/US2014/034307, Written Opinion mailed Aug. 11, 2014", 5 pgs.
"International Application Serial No. PCT/US2014/034337, International Search Report mailed Aug. 8, 2014", 3 pgs.
"International Application Serial No. PCT/US2014/034337, Written Opinion mailed Aug. 8, 2014", 6 pgs.
"International Application Serial No. PCT/US2014/034480, International Search Report mailed Aug. 26, 2014", 3 pgs.
"International Application Serial No. PCT/US2014/034480, Written Opinion mailed Aug. 26, 2014", 4 pgs.
"International Application Serial No. PCT/US2014/034879, International Search Report mailed Aug. 28, 2014", 3 pgs.
"International Application Serial No. PCT/US2014/034879, Written Opinion mailed Aug. 28, 2014", 8 pgs.
"International Application Serial No. PCT/US2014/034966, International Search Report mailed Aug. 22, 2014", 3 pgs.
"International Application Serial No. PCT/US2014/034966, Written Opinion mailed Aug. 22, 2014", 5 pgs.
"International Application Serial No. PCT/US2014/035409, International Search Report mailed Aug. 26, 2014", 4 pgs.
"International Application Serial No. PCT/US2014/035409, Written Opinion mailed Aug. 26, 2014", 6 pgs.
"Taiwanese Application Serial No. 103113875, Amendment filed Oct. 16, 2014", English Translation, 2 pgs.
"Views on the use of DM RS ports / scrambling sequences for MU-MIMO", R1-103830, 3GPP TSG-RAN WG1 Meeting #61bis, (2010), 6 pgs.
Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: <http://i.eexplore.ieee.org/stamp/stamp.jsparnumber=4109444>, (2006), 5 pgs.
"U.S. Appl. No. 14/107,400, Advisory Action mailed Jan. 21, 2016", 3 pgs.
"U.S. Appl. No. 14/107,400, Final Office Action mailed Oct. 7, 2015", 32 pgs.
"U.S. Appl. No. 14/107,400, Response filed Jan. 5, 2016 to Non Final Office Action mailed Oct. 7, 2015", 10 pgs.
"U.S. Appl. No. 14/107,400, Response filed Aug. 26, 2015 to Non Final Office Action mailed May 27, 2015", 10 pgs.
"U.S. Appl. No. 14/109,121, Corrected Notice of Allowance mailed Jan. 7, 2016", 2 pgs.

(56) References Cited

OTHER PUBLICATIONS

"U.S. Appl. No. 14/109,121, Notice of Allowance mailed Nov. 25, 2015", 9 pgs.
"U.S. Appl. No. 14/109,121, Response filed Nov. 13, 2015 to Non Final Office Action mailed Aug. 14, 2015", 10 pgs.
"U.S. Appl. No. 14/132,525, Notice of Allowance mailed Dec. 22, 2015", 9 pgs.
"U.S. Appl. No. 14/132,974, Notice of Allowance mailed Nov. 16, 2015", 7 pgs.
"U.S. Appl. No. 14/132,974, Response filed Oct. 2, 2015 to Non Final Office Action mailed Jul. 10, 2015", 7 pgs.
"U.S. Appl. No. 14/135,265, Response filed Oct. 28, 2015 to Non Final Office Action mailed Jul. 29, 2015", 8 pgs.
"U.S. Appl. No. 14/140,823, Non Final Office Action mailed Nov. 23, 2015", 11 pgs.
"U.S. Appl. No. 14/140,823, Response filed Nov. 5, 2015 to Non Final Office Action mailed Aug. 5, 2015", 7 pgs.
"U.S. Appl. No. 14/141,985, Notice of Allowance mailed Oct. 26, 2015", 18 pgs.
"U.S. Appl. No. 14/141,985, Response filed Oct. 2, 2015 to Non Final Office Action mailed Jul. 8, 2015", 7 pgs.
"International Application Serial No. PCT/US2014/031845, International Preliminary Report on Patentability mailed Oct. 8, 2015", 6 pgs.
"International Application Serial No. PCT/US2014/033965, International Preliminary Report on Patentability mailed Nov. 5, 2015", 7 pgs.
"International Application Serial No. PCT/US2014/034307, International Preliminary Report on Patentability mailed Nov. 5, 2015", 7 pgs.
"International Application Serial No. PCT/US2014/034337, International Preliminary Report on Patentability mailed Nov. 5, 2015", 8 pgs.
"International Application Serial No. PCT/US2014/034480, International Preliminary Report on Patentability mailed Nov. 5, 2015", 6 pgs.
"International Application Serial No. PCT/US2014/034879, International Preliminary Report on Patentability mailed Nov. 5, 2015", 10 pgs.
"International Application Serial No. PCT/US2014/034966, International Preliminary Report on Patentability mailed Nov. 5, 2015", 7 pgs.
"International Application Serial No. PCT/US2014/035409, International Preliminary Report on Patentability mailed Nov. 5, 2015", 8 pgs.
"Taiwanese Application Serial No. 103113700, Office Action mailed Oct. 28, 2015", W/ English Search Report, 9 pgs.
"Taiwanese Application Serial No. 103113875, Office Action mailed Oct. 8, 2015", W/ English Translation, 22 pgs.
"Taiwanese Application Serial No. 103113875, Response filed Jan. 13, 2016 to Office Action mailed Oct. 8, 2015", (English Translation of Claims), 13 pgs.
"Taiwanese Application Serial No. 103113897, Office Action mailed Dec. 14, 2015", W/ English Search Report, 7 pgs.
"Taiwanese Application Serial No. 103113898, Office Action mailed Sep. 17, 2015", W/ English Search Report, 9 pgs.
"Views on the use of DM RS ports / scrambling sequences for MU-MIMO", 3GPP TSG-RAN WG1 Meeting #61bis R1-103830 Dresden, (Jun. 28-Jul. 2, 2010).
"U.S. Appl. No. 14/107,400, Notice of Allowance mailed Mar. 2, 2016", 9 pgs.
"U.S. Appl. No. 14/109,121, Corrected Notice of Allowance mailed Mar. 1, 2016", 2 pgs.
"U.S. Appl. No. 14/135,265, Advisory Action mailed May 20, 2016", 4 pgs.
"U.S. Appl. No. 14/135,265, Response filed Apr. 11, 2015 to Final Office Action mailed Feb. 11, 2016", 11 pgs.
"U.S. Appl. No. 14/140,823, Notice of Allowance mailed Apr. 6, 2016", 5 pgs.
"U.S. Appl. No. 14/140,823, Response filed Feb. 23, 2016 to Non Final Office Action mailed Nov. 23, 2015", 8 pgs.
"U.S. Appl. No. 15/083,897, Preliminary Amendment filed Apr. 19, 2016", 9 pgs.
"Taiwanese Application Serial No. 103113700, Response filed Apr. 28, 2016 to Office Action mailed Oct. 28, 2015", W/ English Claims, 66 pgs.
"Taiwanese Application Serial No. 103113875, Office Action mailed Mar. 25, 2016", W/ English Translation, 5 pgs.
"Taiwanese Application Serial No. 103113876, Office Action mailed Apr. 25, 2016", W/ English Translation, 16 pgs.
"Taiwanese Application Serial No. 103113898, Response filed Mar. 17, 2016 to Office Action mailed Sep. 17, 2015", W/ English Claims, 31 pgs.
"3GPP IMS WebRTC WID Overview", Alcatel-Lucent Shanghai-Bell 3GPP TSG-SA WG1#60 S1-124342, [Online]:<URL:http://www.3gpp.org/ftp/tsg_sa/WG1_Serv/TSGS1_60_Edinburgh/docs/S1-124342.zip>.
"European Application Serial No. 14788589.1, Extended European Search Report mailed Oct. 7, 2016", 10 pgs.
"European Application Serial No. 16168880.9, Extended European Search Report mailed Oct. 10, 2016", 6 pgs.
"Japanese Application Serial No. 2016-505623, Office Action mailed Oct. 11, 2016", W/ English Translation, with English Translation, 5 pgs.
"MIME Type Registration for RTP Payload Format for H.224; rfc4573.txt", Even A Lochbaum P0lyc0m R 5.' JCT-VC Meeting; 96. MPEG Meeting XP015O55010,, [Online]:<HTTP://WFTP3.ITU.INT/AV-ARCH/JCTVC-SITE/>, (Jul. 1, 2006).
"Roi Permanent Document Requirements, Working Assumptions and Potential Solutions", Intel (ROI Rapporteur): 3Gpp Draft; S4150446_ROI_PERMANENT_DOCUMENT_V110_FINA L, 3RD Generation Partnership Project (3GPP), Mobile Competence Centre ; 650, Route Des Lucioles ; F-06921 Sophia-Antipolis Cedex ; France vol. SA WG4, No. Bratislava , Slovakia, [Online]:<http://www.3gpp.org/ftp/Meetings_3GPPSYNC/SA4/Docs/>, (Apr. 16, 2016), Apr. 13, 2015-Apr.17, 2016.
"Taiwanese Application Serial No. 103113875, Office Action mailed Sep. 22, 2016", W/ English Translation, 14 pgs.
"Taiwanese Application Serial No. 103113875, Response filed Jun. 24, 2016 to Office Action mailed Mar. 25, 2016", W/ English Claims, 10 pgs.
"Taiwanese Application Serial No. 103113876, Office Action mailed Aug. 29, 2016", W/ English Translation, 5 pgs.
"Taiwanese Application Serial No. 103113876, Response filed Jul. 22, 2016 to Office Action mailed Apr. 25, 2016", W/ English Claims, 12 pgs.
"Taiwanese Application Serial No. 105115759, Office Action mailed Aug. 24, 2016", W/ English Claims, 2 pgs.

* cited by examiner

ARCHITECTURE FOR WEB-BASED REAL-TIME COMMUNICATIONS (WEBRTC) TO ACCESS INTERNET PROTOCOL MULTIMEDIA SUBSYSTEM (IMS)

CLAIM OF PRIORITY

This application claims the benefit of priority under 35 U.S.C. 119(e) to U.S. Provisional Patent Application Ser. No. 61/816,662, filed on Apr. 26, 2013, which is incorporated herein by reference in its entirety.

BACKGROUND

An Internet Protocol (IP) session involves the connection between two devices across a network of routers, cables, and switches for the purpose of exchanging packets of information. For example, a web browser can establish an IP-based Hypertext Transfer Protocol Secure (HTTPS) session with a website for the purpose of retrieving information. In another example, a device can establish a Session Initiation Protocol (SIP) session with another computing device to, e.g., conduct a phone call.

Web browsers have recently begun adopting the Web Real-Time Communication (WebRTC) protocol for the purpose of establishing real-time audio and video sessions between browser clients. WebRTC enables web browsers with Real-Time Communications (RTC) capabilities via simple JavaScript APIs. The web platform provides a way of viewing a wide variety of content, provides developers with a write-once deploy-everywhere model, and supports service providers in deploying services with global reach. Browser-technology enhancements, exemplified by HTML5, and the ongoing work to add real-time communication to the web platform create new opportunities for combining communication and data, and improving the user experience.

The IP Multimedia Subsystem or IP Multimedia Core Network Subsystem (IMS) is an architectural framework for delivering IP multimedia services. IMS is based primarily on Session Initiation Protocol (SIP) as a rich, real-time media session protocol for IP networks, and as such, relies on SIP-based endpoints and soft-clients to register and support subscribers on the services. The IMS architecture is designed to separate the services offered by fixed-line (traditional telecommunications companies), mobile (traditional cellular), and converged service providers (cable companies and others who provide triple-play, e.g., voice, video, and data services) from the access networks used to receive those services.

An IMS capable terminal uses an application on the user equipment UE) to sends and receive SIP requests. However, an IMS capable terminal may be implemented as software on a PC, on an IP phone, etc. However, a WebRTC client enabled device, such as a UE, does not include IMS client capability and thus cannot access the IMS core.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

According to an embodiment, an Application Signaling Interworking Function (ASIF) is provided for enabling a WebRTC client to access to IMS core. Without the ASIF, the WebRTC client enabled UE does not have IMS client capability. By providing the ASIF in the UE, then the UE may also become an IMS capable UE. Thus, the WebRTC client access to IMS feature provided by the ASIF allows an IMS operator to offer IMS services to a user running a compatible WebRTC-enabled web application in their WebRTC enabled browser. The user will access the application from a web page offered either directly by the IMS operator or by a third party that has a business relationship with the IMS operator. The ASIF supports native IMS subscribers, third-party subscribers, and anonymous users, depending on the application type and ownership. WebRTC extends the reach of IMS services. WebRTC may also extend the service and contact reach of present on-net subscribers to virtually any endpoint that can run an HTML5 browser. A subscriber may access IMS services from any browser equipped device, e.g., PC, tablet, smartphone, television, etc., without client/application installations, operating system versions or device manufacturer support.

Figure 1:
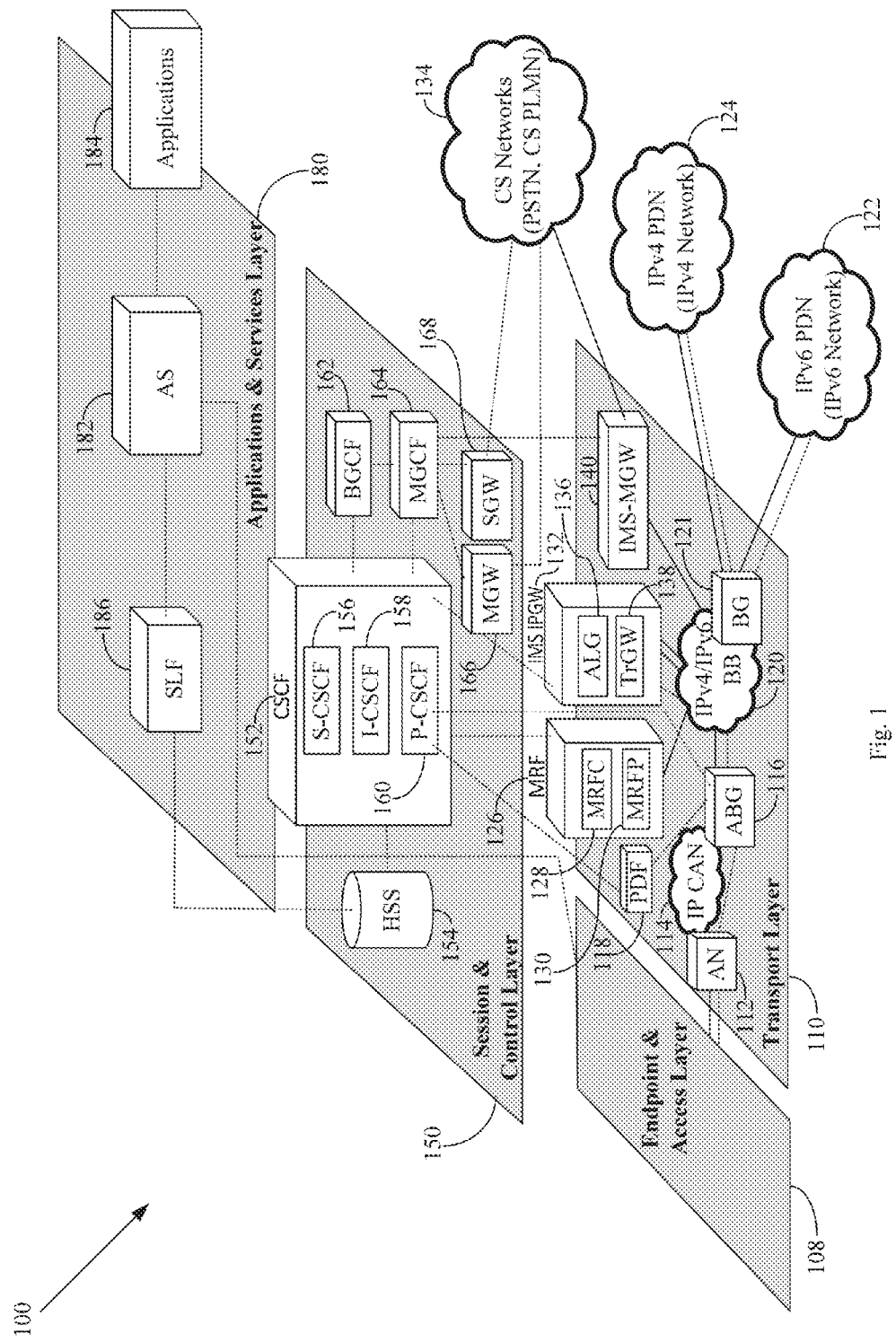
FIG. 1 illustrates an IMS architecture according to an embodiment.

FIG. 1 illustrates an IMS architecture 100 according to an embodiment. In FIG. 1, the IMS architecture 10 includes three layers: the first layer includes the Endpoint and Access layer 108 and the Transport Layer 110, the Session and Control layer 150 and the Application and Services Layer 180. The Transport and Endpoint Layer 110 unifies transports and media from analog, digital, or broadband formats to Real-time Transport Protocol (RTP) and SIP protocols. The Endpoint and Access Layer 108 initiates and terminates the SIP signaling, setting up sessions and providing bearer services, including the conversion from analog or digital formats to packets.

In the Transport Layer 110, the Access Network (AN) 112 is an IP network that includes access network routers. IP Connectivity Access Network (IP CAN) 114 is an access network that provides Internet Protocol (IP) connectivity, and according to 3GPP IP Multimedia Subsystem (IMS) standards, IP CAN 114 may refer to any kind of IP-based access network. An Access Border Gateway (ABG) 116 functions as a packet gateway between an access network and a core network used to mask a service provider's network from access networks, through which end-user functions accessing packet-based services may include opening and closing gates, packet filtering based firewall, traffic classification and marking, traffic policing and shaping, network address and port translation, etc.

The Policy Decision Function (PDF) 118 is responsible for making policy decisions based on session and media-related information obtained from the Proxy Call Session Control Function (P-CSCF) 160, which is described below. IPv4/IPv6 Backbone (BB) 120 provides the infrastructure for carrying IPv4 and IPv6 packets. A Border Gateway 121 policy enforcement and network address translation (NAT) functions and acts as a gateway to Packet Data Networks (PDN). An IPv6 Packet Data Network (PDN) 122 uses IPv6 packets for communications and an IPv4 Packet Data Network (PDN) 124 is a network that uses IPv4 packets. Media are handled by the Media Resource Function (MRF) 126, which includes the Media Resource Function Controller (MRFC) 128 and Media Resource Function Processor (MRFP) 130, which may also be referred to as the Media Server (MS).

IP Multimedia Subsystem IP gateway (IMS IPGW) 132 acts as a gateway between the IMS layers 100 and other networks, e.g., Circuit Switched (CS) Networks 134, the IPv6 PDN 122, IPv4 PDN 124, etc. The CS Networks 134 supports phone calls and packet-switched networks handled data. The Application Level Gateway (ALG) 136 translates SIP and SDP messages between IPv4 and IPv6 networks. The Transition Gateway (TrGW) 138 provides functions like network address/port translation and IPv4/IPv6 protocol translation. The IMS Media Gateway (IMS-MGW) 140 terminates bearer channels from a switched circuit network and media streams from a packet network. The IMS-MGW 140 supports media conversion, bearer control, and payload processing.

The Session and Control Layer 150 manages logical connections between various other network elements. The Session and Control Layer 150 provides registration of end-points, routing of SIP messages, and overall coordination of media and signaling resources. The Session and Control Layer includes the Call Session Control Function (CSCF) 152 and the Home Subscriber Server (HSS) database 154. The HSS 154 maintains the service profile for each end user, including registration information, preferences, roaming, voicemail options, and buddy lists. The Call Session Control Function (CSCF) 152 intercepts call signaling and passes it to the application services for them to handle. The Home Subscriber Server (HSS) database 154 pulls subscriber data together under an interface.

The Serving Call Session Control Function (S-CSCF) 156 is the core of the IMS and provides the point of control within the network that enables operators to control service delivery and sessions. The S-CSCF 156 is a SIP server having in charge of handling the aspects of the services for a subscriber, maintaining the status of the sessions the user has initiated and controlling and delivering of the content. The S-CSCF 156 has knowledge of the services subscribed by the users, and it has the responsibility of enabling such services by contacting the appropriate Application Server 182, which is described below.

The Interrogating Call Session Control Function (I-CSCF) 158 acts as a gateway for the IMS network, and it is located at the edge of each administrative domain. The I-CSCF 158 grants or denies access to the operator network by external network forwarding SIP messages thereby protecting entities like the S-CSCF 156 and the HSS 154. The Proxy Call Session Control Function (P-CSCF) 160 is the access point to IMS and acts as a SIP proxy server for the user equipment (UEs).

The Breakout Gateway Control Function (BGCF) 162 selects the network in which a PSTN breakout is to occur, e.g., a connection with the PSTN. The Media Gateway Control Function (MGCF) 164 controls the MGW to provide IMS connections to PSTN trunks and performs protocol conversion between ISUP and SIP. The Media Gate (MGW) 166 interacts with the MGCF 164 for resource control. The MGW 166 acts as a translation unit between disparate telecommunications networks such as PSTN; Next Generation Networks; 2G, 2.5G and 3G radio access networks or PBX. The MGW 166 enables multimedia communications across Next Generation Networks over multiple transport protocols such as ATM and IP. A MGW 166 may also perform the conversion between TDM voice, to Voice over Internet Protocol (VoIP), e.g., when arranged as a VoIP MGW. As the MGW 166 connects different types of networks, one of its main functions is to convert between the different transmission and coding techniques. The Signaling Gateway (SGW) 168 is used to interconnect different signaling networks, such as SCTP-IP-based signaling networks and SS7 signaling networks, and performs signaling conversion at the transport level.

The Application Services Layer 180 contains multiple Application Servers (AS) 182, e.g., a Telephony Application Server (TAS), IP Multimedia Services Switching Function (IM-SSF), Open Service Access Gateway (OSA-GW), etc. Each of these servers is responsible for performing functions on subscriber sessions, maintaining the state of the call. More importantly, they bridge legacy Advanced Intelligent Network (AIN) services in the new world of IMS. The AS 182 provides a service execution environment, application-specific logic (e.g., Push To Talk, Presence, Prepaid, Instant messaging), and the signaling for one or more services. The AS 182 may influence and impact the SIP session on behalf of the services and provisions applications 184. The subscriber location function (SLF) 186 is an entity within an IP multimedia subsystem that provides information about the home subscriber server (HSS) 154 that is associated with a particular user profile.

Figure 2:
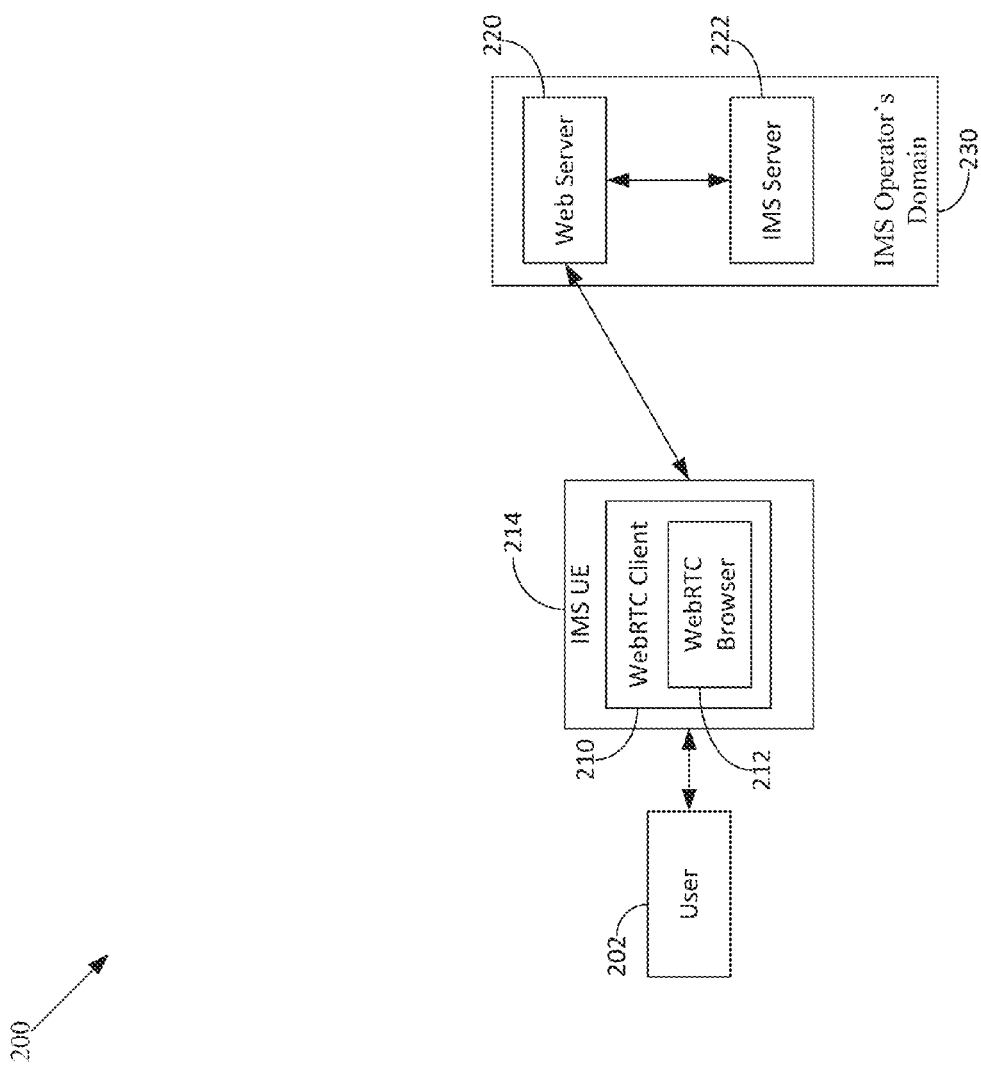
FIG. 2 illustrates an IMS UE using a WebRTC client to access a web server owned by IMS operator.

FIG. 2 illustrates an IMS UE using a WebRTC client to access a web server owned by IMS operator 200. In FIG. 2, the WebRTC-based client/application 210 supports broad IMS client capabilities. A user 202 uses a WebRTC client 210, which may include a WebRTC capable browser 212, on an IMS UE 214 to access a web server 220. The web server 220 is able to access an IMS server 222. The web server 220 and the IMS server 222 are within the IMS operator's domain 230.

Figure 3:
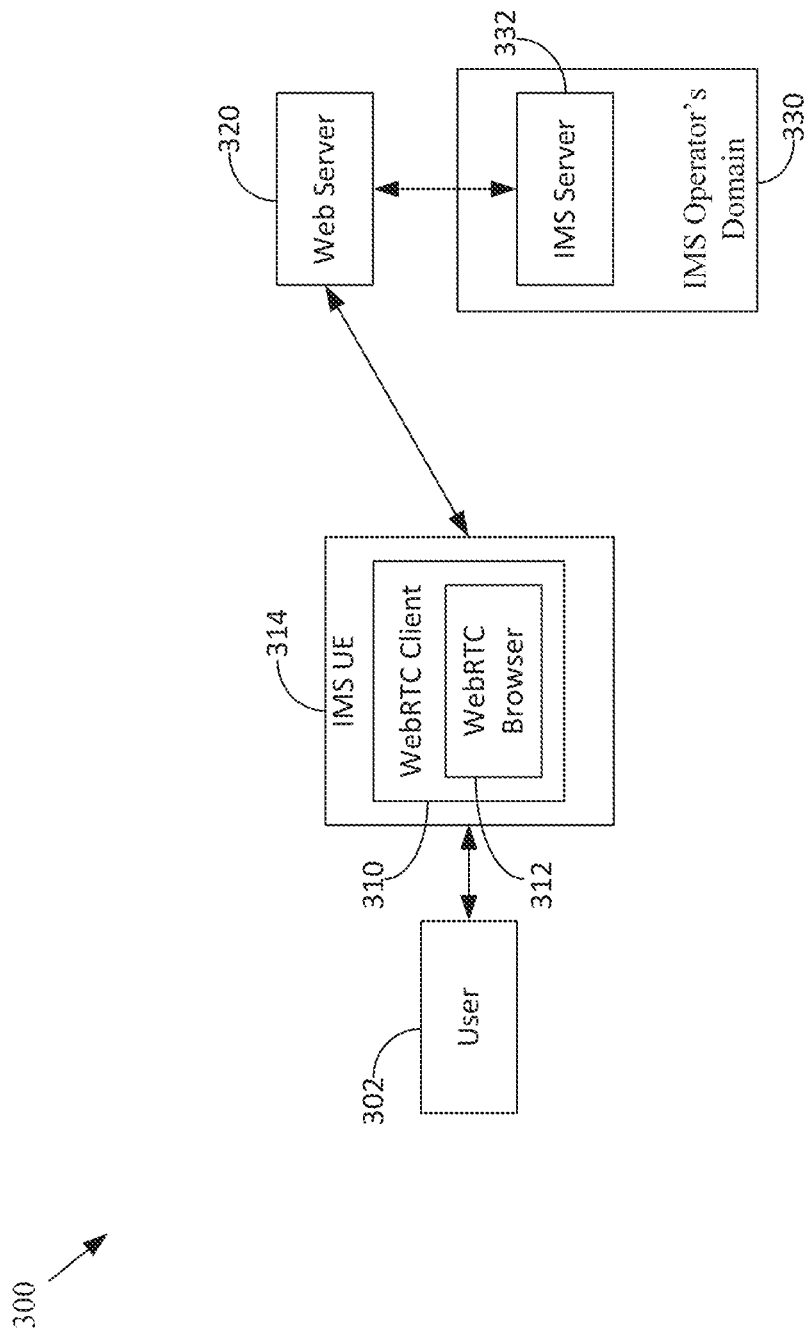
FIG. 3 illustrates an IMS UE using a WebRTC client to access a web server owned by a third party.

FIG. 3 illustrates an IMS UE using a WebRTC client to access a web server owned by a third party 300. In FIG. 3 the user 302 obtains their IMS service via third-party WebRTC-based application server 320. The user 302 uses a WebRTC client 310, which may include a WebRTC capable browser 312, on an IMS UE 314 to access the web server 320. The web server 320 then accesses an IMS server 332. However, in FIG. 3, the web server 320 is not part of the IMS operator's domain 330. Rather, the web server 320 has a business relationship with the operator providing IMS operator's domain 330. The business relationship between the home IMS operator and the third party ensure use of a compatible client application 310 and the establishment of the security relationships between the IMS UE 314 and the web server 320.

Figure 4:
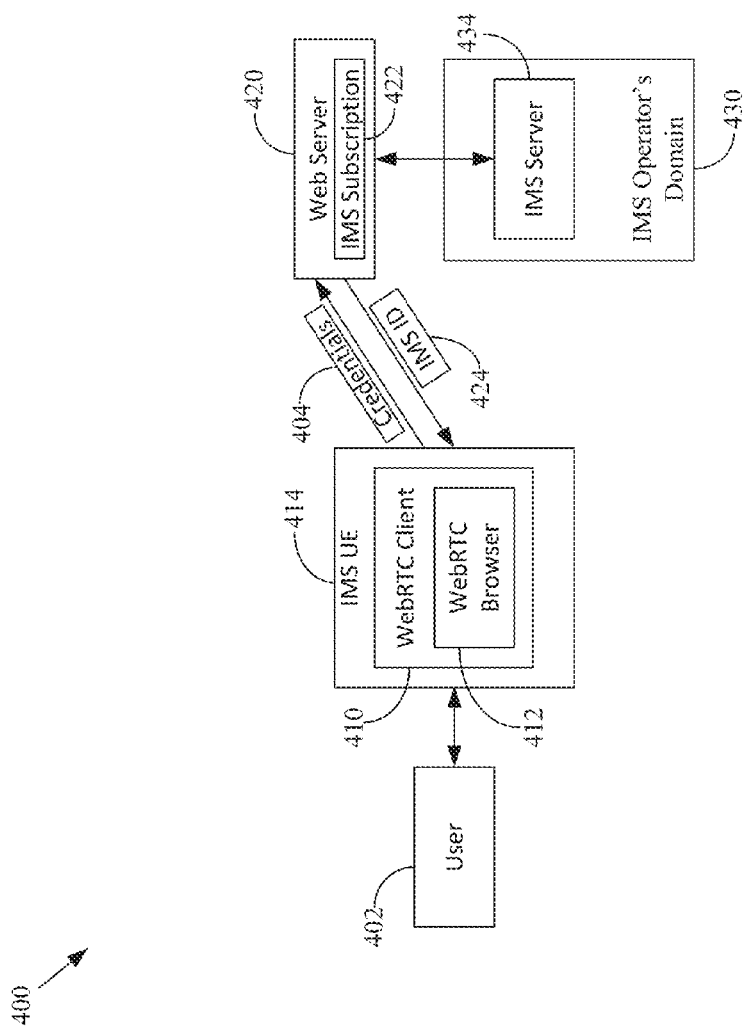
FIG. 4 illustrates an IMS UE using a WebRTC client to access a web server having an IMS subscription.

FIG. 4 illustrates an IMS UE using a WebRTC client to access a web server having an IMS subscription 400. The user 402 uses a WebRTC client 410, which may include a WebRTC capable browser 412, on an IMS UE 414 to access the web server 420. In FIG. 4, the web server 420 has an IMS subscription 422 with multiple public identities. Thus, the web server 420 is not a part of the IMS operator's domain 430. The web server 420 is able to access an IMS server 432. The user 402 provides login credentials 404 to the web server 420 and obtains a temporary IMS public identity 424 via the web server 420.

Figure 5:
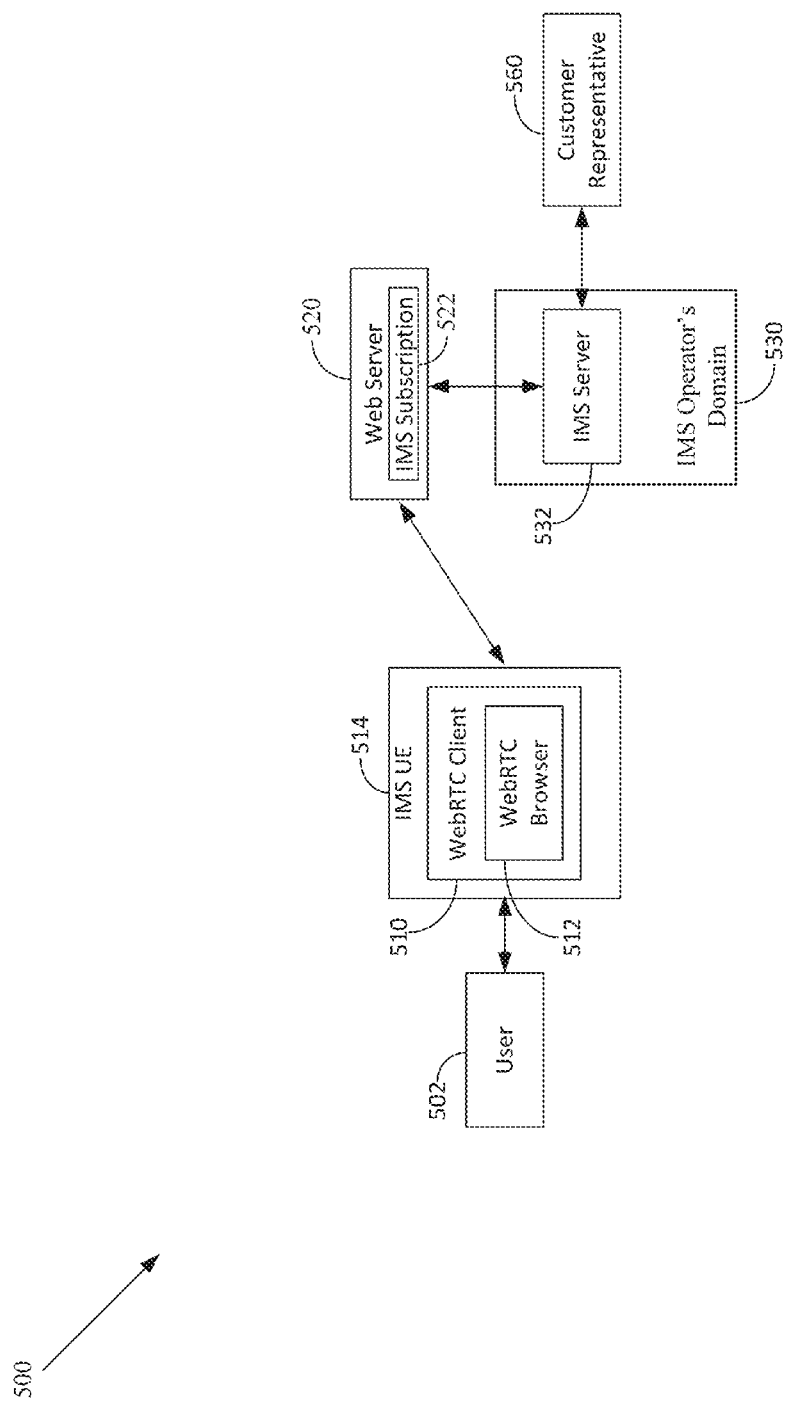
FIG. 5 illustrates an anonymous user obtains IMS service via a third-party WebRTC-based application.

FIG. 5 illustrates an anonymous user obtains IMS service via a third-party WebRTC-based application 500. The user 502 uses a WebRTC client 510, which may include a WebRTC capable browser 512, on an IMS UE 514 to access the web server 520. The web server 520 is able to access an IMS server 532. In FIG. 5, the user 502 may only be able to contact, for example, a customer representative 560 for the IMS operator's domain 530. Again, the web server 520 is not part of the IMS operator's domain 530, but instead has an IMS subscription 522 with multiple public identities. The user 502 is able to contact the customer representative 560 for the IMS operator's domain 530 via an anonymous call using an IMS public identity from the web server 520.

Figure 6:
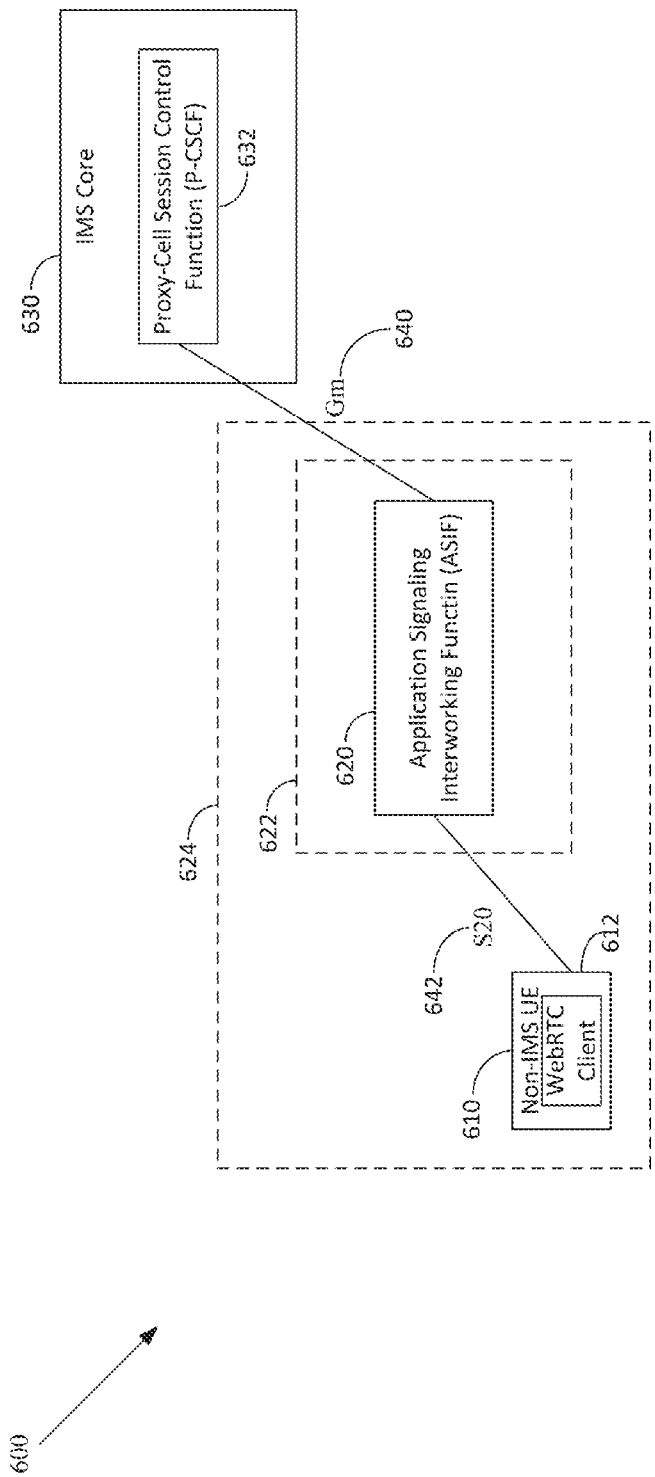
FIG. 6 illustrates an Application Signaling Interworking Function (ASIF) in a network according to an embodiment.

FIG. 6 illustrates an Application Signaling Interworking Function (ASIF) in a network 600 according to an embodiment. In FIG. 6, a non-IMS UE 610 would like to access services from the IMS Core 630. To provide functions for the non-IMS UE 610 to access services from the IMS Core 630, an Application Signaling Interworking Function (ASIF) 620 is co-located with the IMS UE 610.

An UE belonging to the same family subscription may be IMS capable while others are not. When a user is using a non-IMS UE 610 to access the IMS Core 630 of the mobile network operator (MNO), the user may be able to attach the non-IMS UE 610 to an IMS UE first and then register to the IMS Core 630 to establish IMS session via an IMS UE.

Registration is a prerequisite for accessing IMS Core 630 using a UE. Ordinarily, SIP UEs initiate IMS registration on their own. But a non-IMS UE 610, without the ASIF 620, do not include this capability. Thus, the ASIF 620 enables a non-IMS UE 610 to supply IMS credentials. Accordingly, the IMS credentials may be either supplied by the non-IMS UE 610 via the ASIF 620 or by an IMS UE.

The non-IMS UE 610 may access the ASIF 620 via a S20 interface 642. Thus, the S20 interface 642 provides a new reference point between a non-IMS UE 610 and ASIF 620. A Gm interface 640 is the current reference point between IMS clients, e.g., the non-IMS UE 610 through the ASIF 620, and a Proxy-Cell Session Control Function (P-CSCF) 632. The P-CSCF 632 controls the access gateway functions used to adapt bearer flows for the IMS. Call Session Control Function (CSCF) processes SIP signaling packets in the IMS. A P-CSCF 632 is a SIP proxy that is the first point of contact for an UE via the ASIF 620, and may be located in the visited network (in full IMS networks) or in the home network (when the visited network is not IMS compliant yet).

The P-CSCF 632 maintains secure transport connections to known entities in the home and third party networks. The P-CSCF 632 may control the media plane interworking functions provided by the access gateway, including those additional media plane functions specific to WebRTC.

The ASIF 620 translates WebRTC based application signaling, e.g. HTTP/HTML5, into IMS signaling, e.g., Session Initiation Protocol (SIP), which is on the application signaling path between a WebRTC client 612 and the IMS Core 630. The ASIF 620 may be located in an IMS UE 610 as represented by box 622 or other entity 624 as represented by box 622, such as a Web Server, P-CSCF, other intermediate function entity or an independent function entity. The ASIF 620 may be owned by a user, a public land mobile network (PLMN), an IMS operator or a third party service provider. The ASIF 620 helps the non-IMS UE 610 to use IMS services by translating web based signaling into IMS based signaling. Accordingly, the ASIF 620 is on the application signaling path between non-IMS UE 610 and IMS Core 630.

The ASIF 620 may support control plane and negotiation of media plane interworking procedures between the WebRTC client 612 and IMS Core 630. For session signaling between the non-IMS UE 610 and the network, information to enable the supported options for user identification, authentication and registration in the IMS Core 630 are exchanged.

Figure 7:
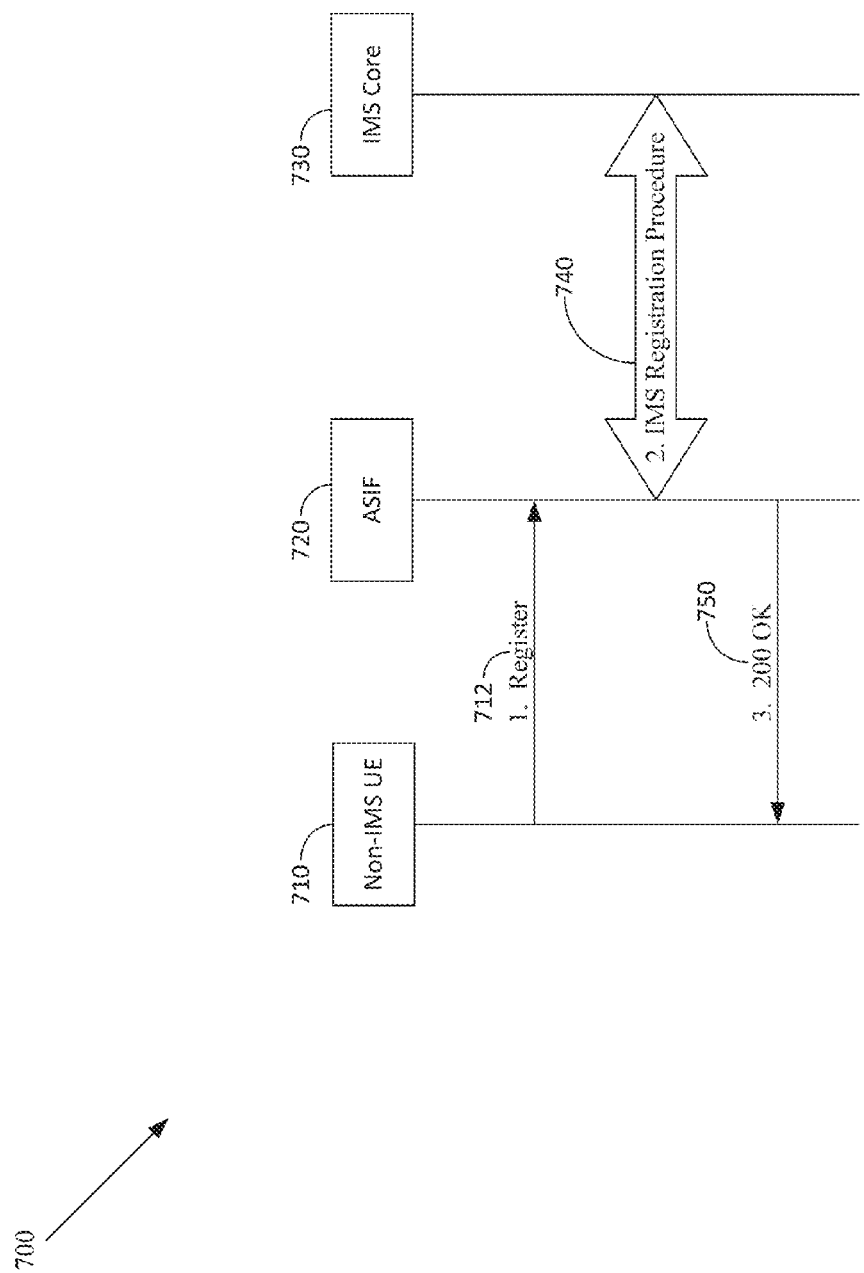
FIG. 7 illustrates a registration procedure according to an embodiment.

FIG. 7 illustrates a registration procedure 700 according to an embodiment. A non-IMS UE 710 registers 712 with the ASIF 720. This is equivalent to an HTTP register message. When the ASIF 720 receives the register message 712 from a non-IMS UE 710, the ASIF 720 will translate the register message into the equivalent SIP register message and initiate the IMS Registration procedure 740 with the IMS Core 730. If the IMS registration procedure 740 is successful, the ASIF 720 sends an equivalent SIP 200 OK message 750 to the non-IMS UE 710. The SIP 200 OK message is a message indicating a successful response to a request.

Figure 8:
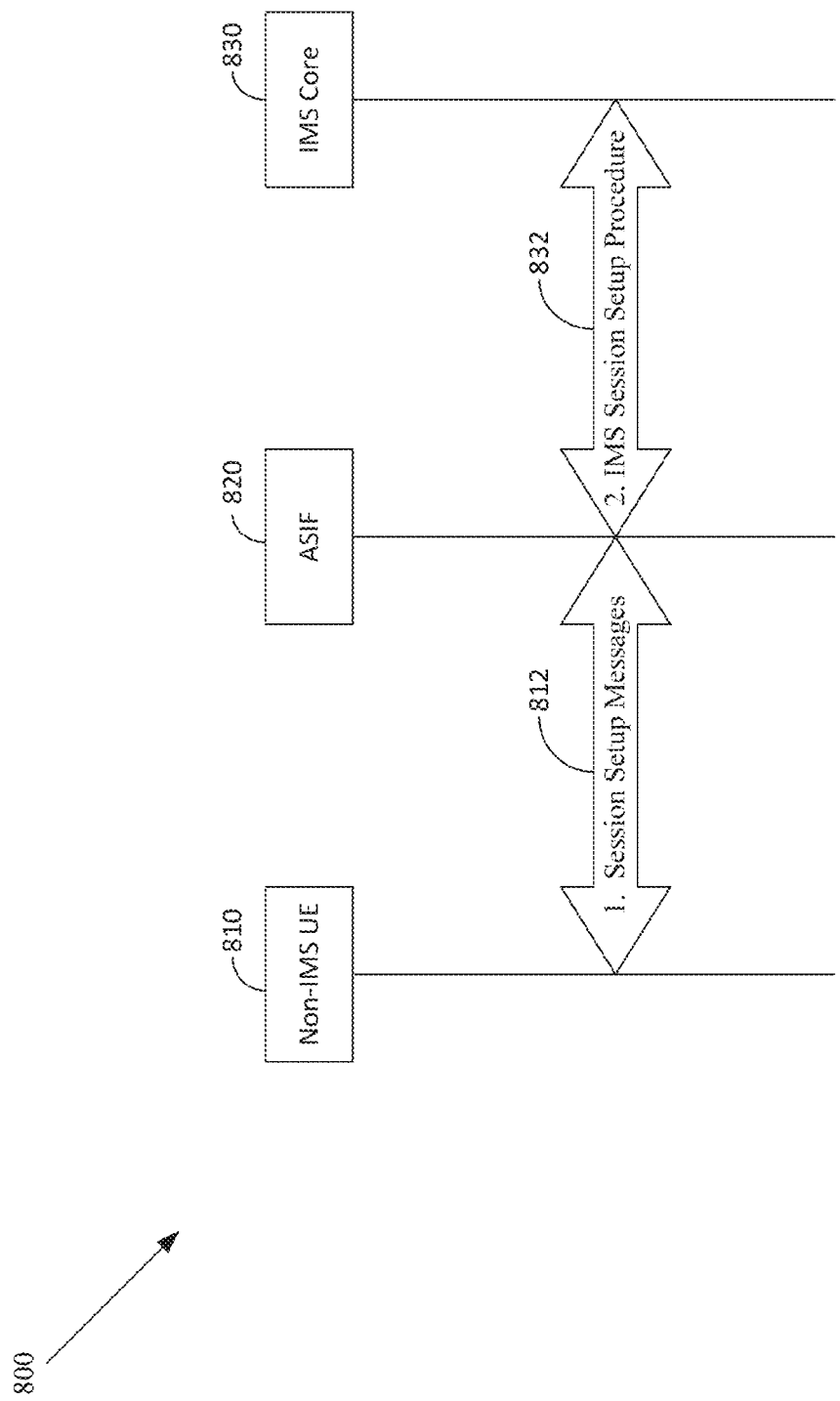
FIG. 8 illustrates a Session Setup Procedure according to an embodiment.

FIG. 8 illustrates a Session Setup Procedure 800 according to an embodiment. The Session Setup Procedure 800 includes an HTTP session setup message interaction 812 between the non-IMS UE 810 and ASIF 820. The IMS session setup procedure 832 is performed between the ASIF 820 and the IMS Core 830.

Figure 9:
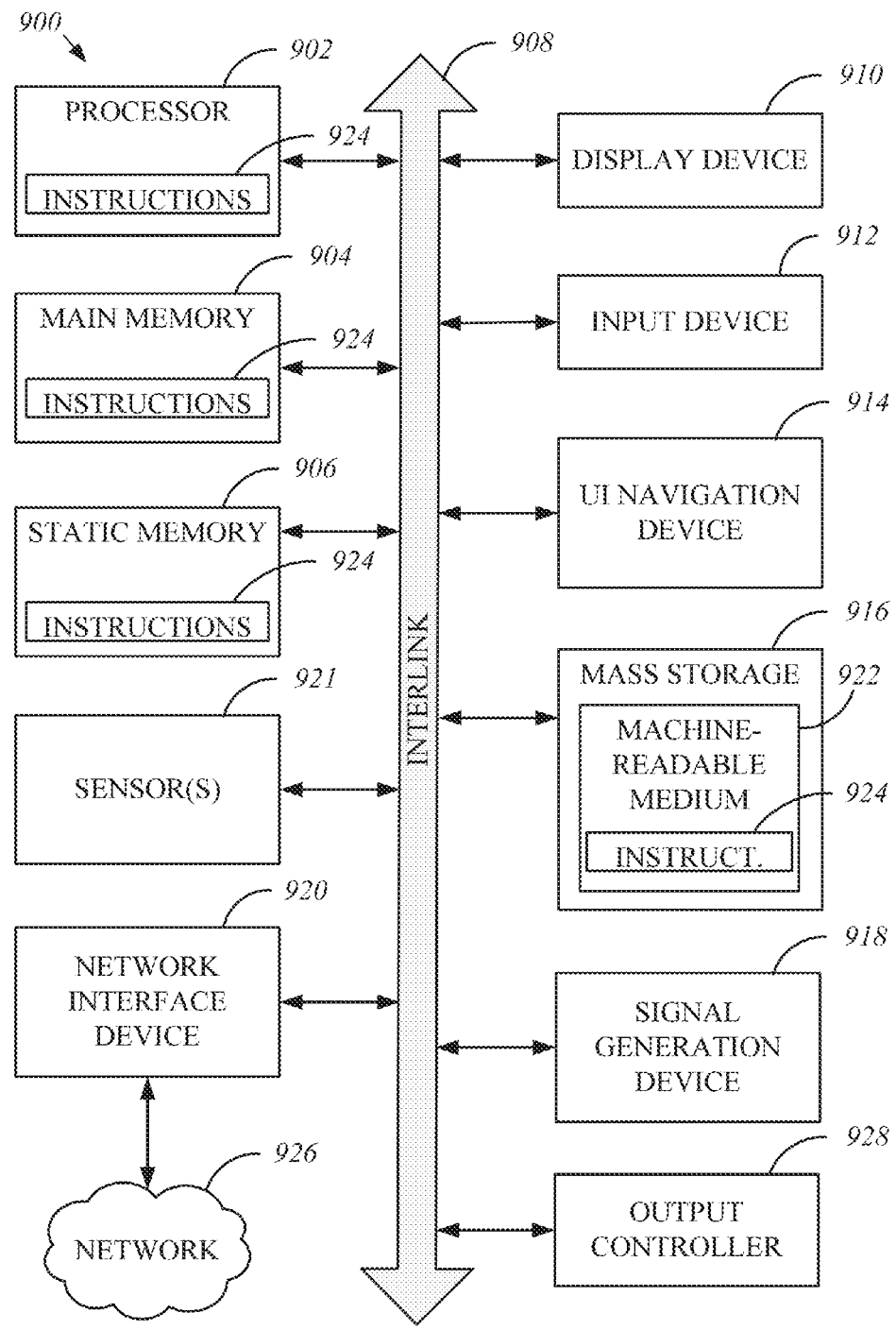
FIG. 9 illustrates a block diagram of an example machine for providing efficient wideband inverse channelization for direct digital synthesizer based jamming techniques according to an embodiment

FIG. 9 illustrates a block diagram of an example machine 900 for providing efficient wideband inverse channelization for direct digital synthesizer based jamming techniques according to an embodiment upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine and/or a client machine in server-client network environments. In an example, the machine 900 may act as a peer machine in peer-to-peer (P2P) (or other distributed) network environment. The machine 900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 902 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 902 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 900 may include a hardware processor 902 (e.g., a central processing unit (CPU), a graphics processing unit (GPU), a hardware processor core, or any combination thereof), a main memory 904 and a static memory 906, at least some of which may communicate with others via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 may include at least one machine readable medium 922 on which is stored one or more sets of data structures or instructions 924 (e.g., software) embodying or utilized by any one or more of the techniques or functions described herein. The instructions 924 may also reside, at least partially, additional machine readable memories such as main memory 904, static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) that configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects. The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium comprising instructions that, when executed on a user equipment (UE), provide Web Real-Time Communication (WebRTC) for the UE to access an Internet Protocol (IP) multimedia subsystem (IMS);
wherein to access includes to:
send, over a Gm interface to a Proxy-Call Session Control Function (P-CSCF), a register message to register the UE with an IMS core; and
receive a request successful message when an IMS registration procedure is successful; and
wherein when the UE is not configured for IMS, the instructions further cause the UE to:
attach to an IMS UE configured for IMS; and
register to the IMS core to establish an IMS session through the IMS UE instead of through the P-CSCF over the Gm interface.

2. The non-transitory machine-readable medium of claim 1, further comprising instructions to cause the UE to:
send a session setup message requesting a session between the UE and the IMS core; and
receive a response to the session setup message from the IMS core for establishing a session between the UE and the IMS core.

3. The non-transitory machine-readable medium of claim 1, wherein the instructions further cause the UE to:
send and receive Session Initiation Protocol (SIP) signaling packets through a SIP proxy function of the P-CSCF.

4. The non-transitory machine-readable medium of claim 1, wherein the Gm interface includes a reference point between the UE and the P-CSCF.

5. The non-transitory machine-readable medium of claim 1, wherein the instructions further cause the UE to register a public identity with the IMS core.

6. The non-transitory machine-readable medium of claim 1, wherein the instructions further cause the UE to provide web-based signaling to the P-CSCF.

7. The non-transitory machine-readable medium of claim 1,
wherein the instructions further cause the UE to receive web-based signaling, converted from SIP signaling, from the P-CSCF; and
wherein the web-based signaling is in accordance with hypertext transfer protocol (HTTP).

8. A user equipment (UE) including hardware processing circuitry to:
send, over a Gm interface to a Proxy-Call Session Control Function (P-CSCF), a register message to register the UE with an IMS core;
wherein when the UE is not configured for IMS, the hardware processing circuitry is further configured to:
attach to an IMS UE configured for IMS; and
register to the IMS core to establish an IMS session through the IMS UE instead of through the P-CSCF over the Gm interface.

9. The UE of claim 8, further comprising:
one or more antennas.

10. The UE of claim 8, wherein the hardware processing circuitry is further to:
send and receive Session Initiation Protocol (SIP) signaling packets through a SIP proxy function of the P-CSCF.

11. The UE of claim 8, wherein the Gm interface includes a reference point between the UE and the P-CSCF.

12. The UE of claim 8, wherein the hardware processing circuitry is further to provide web-based signaling to the P-CSCF.

13. The UE of claim 8,
wherein the hardware processing circuitry is further configured to receive web-based signaling, converted from SIP signaling, from the P-CSCF; and
wherein the web-based signaling is in accordance with hypertext transfer protocol (HTTP).

14. A apparatus of a user equipment (UE), the apparatus comprising:
memory; and processing circuity, configured to:
send, over a Gm interface to a Proxy-Call Session Control Function (P-CSCF), a register message to register the UE with an IMS core;

wherein when the UE is not configured for IMS, the apparatus is to:
attach to an IMS UE configured for IMS; and
register to the IMS core to establish an IMS session through the IMS UE instead of through the P-CSCF over the Gm interface.

15. The apparatus of claim 14, wherein the processing circuitry is further configured to:
send and receive Session Initiation Protocol (SIP) signaling packets through a SIP proxy function of the P-CSCF.

16. The apparatus of claim 14, wherein the Gm interface includes a reference point between the UE and the P-CSCF.

17. The apparatus of claim 14, wherein the processing circuitry is further configured to:
register a public identity with the IMS core.

18. The apparatus of claim 14, wherein the processing circuitry is further configured to:
provide web-based signaling to the P-CSCF.

19. The apparatus of claim 14, wherein the processing circuitry is further configured to:
receive web-based signaling, converted from SIP signaling, from the P-CSCF;
wherein the web-based signaling is in accordance with hypertext transfer protocol (HTTP).

* * * * *